United States Patent [19]

Watson et al.

[11] 4,009,959

[45] Mar. 1, 1977

[54] EXPOSURE CONTROL UNIT

[75] Inventors: Charles J. Watson, Elgin; Larry L. Langrehr, Chicago; John H. Steiner, Evanston, all of Ill.

[73] Assignee: Bell & Howell Company, Chicago, Ill.

[22] Filed: June 26, 1975

[21] Appl. No.: 590,472

[52] U.S. Cl. .............................. 355/71; 352/91 R; 355/18
[51] Int. Cl.² .................... G03B 27/76; G03B 21/36
[58] Field of Search ............ 352/91 R; 355/18, 39, 355/40, 46, 50, 51, 53, 67, 71

[56] References Cited
UNITED STATES PATENTS

| | | | |
|---|---|---|---|
| 2,517,250 | 8/1950 | Shea et al. | 352/91 R |
| 3,480,362 | 11/1969 | Dejoux | 355/40 |
| 3,580,666 | 5/1971 | Vance | 352/91 R |
| 3,682,540 | 8/1972 | Oxberry et al. | 352/91 R |

*Primary Examiner*—Russell E. Adams, Jr.
*Attorney, Agent, or Firm*—John R. Hoffman; Robert J. Schneider; Roger M. Fitz-Gerald

[57] ABSTRACT

A programmable exposure control device for use on a photographic film printer for producing special effects in motion pictures such as a fade-in, fade-out, lap dissolve or other numerous special effects requiring variations in printing beam intensity. The exposure control device comprises a mechanical shutter capable of progressively varying the intensity of the printing beam at any predetermined rate. A control system is provided for operating the shutter and includes a memory portion for storing preselected operating curves for a plurality of film exposure characteristics. The control unit is connected to a tape reader for supplying information to the control unit, for example, relating to the length of the particular fade desired. The tape reader also may provide information for controlling the position at which a fade or other special effect is to begin or end. The control unit also includes a multiple feedback servoloop portion including both position and velocity feedback of the shutter to correct for any deviation from the programmed values. An auxiliary manual control is provided for opening and closing of the shutter, and the entire control unit is optically isolated from the film printer.

26 Claims, 5 Drawing Figures

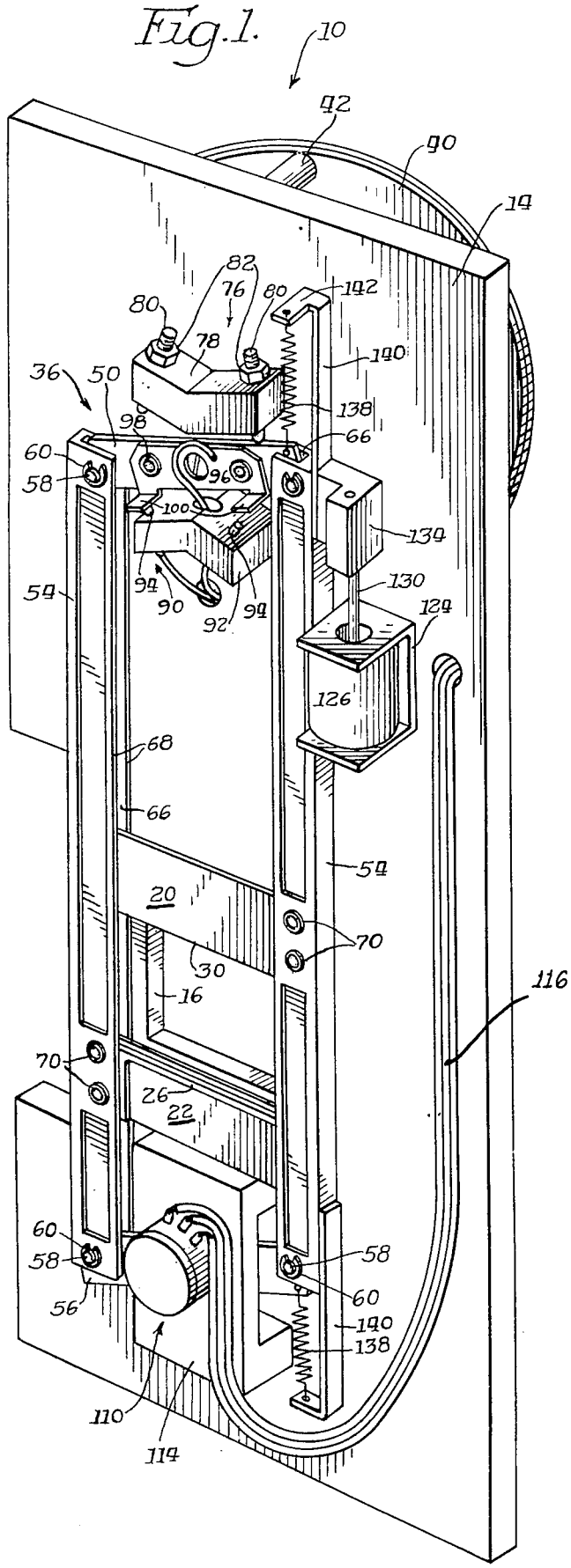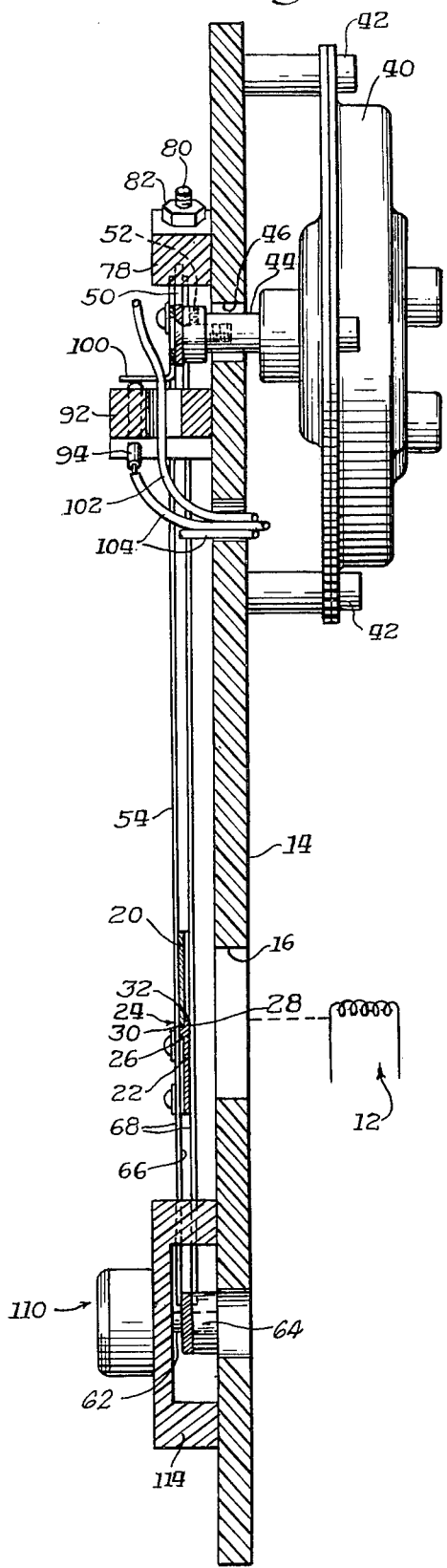

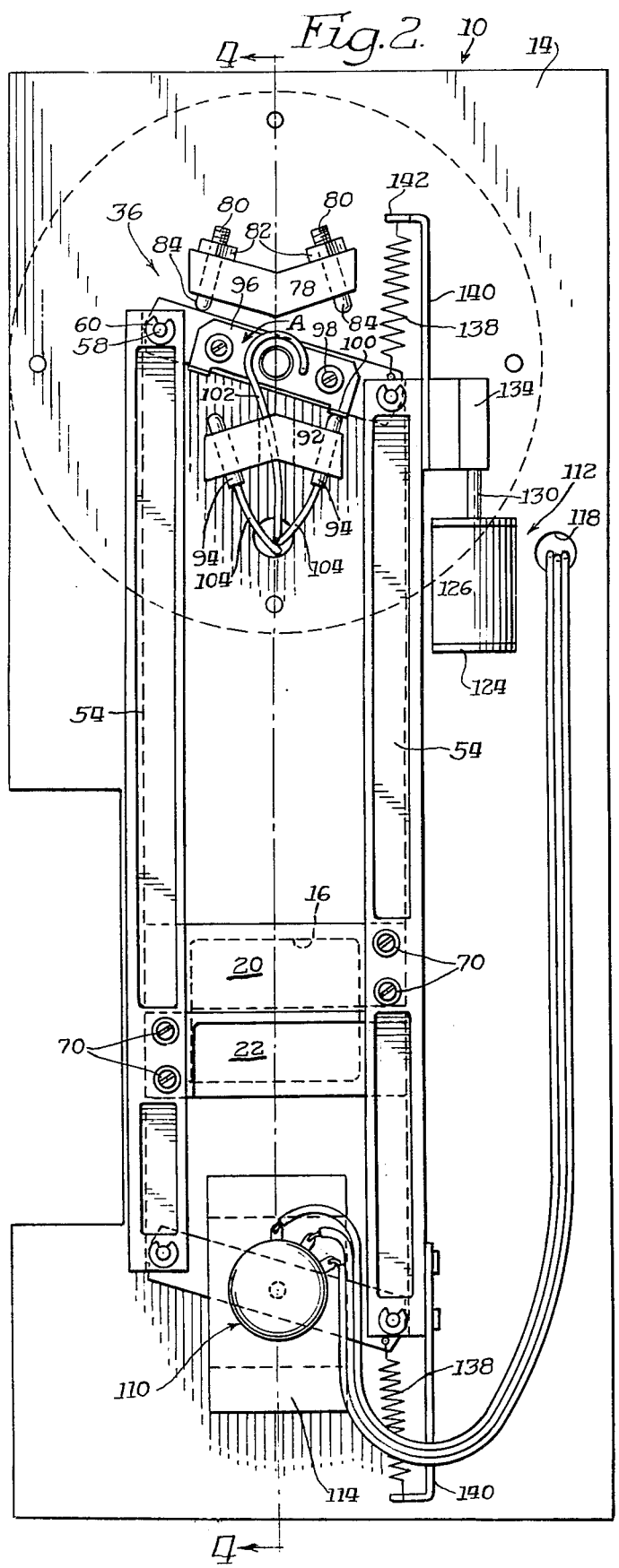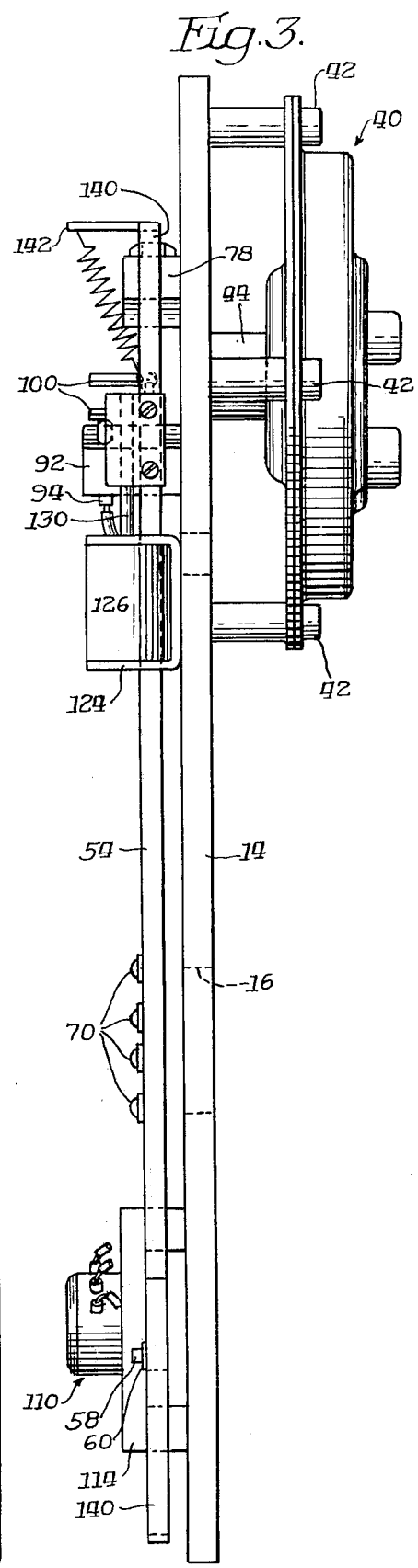

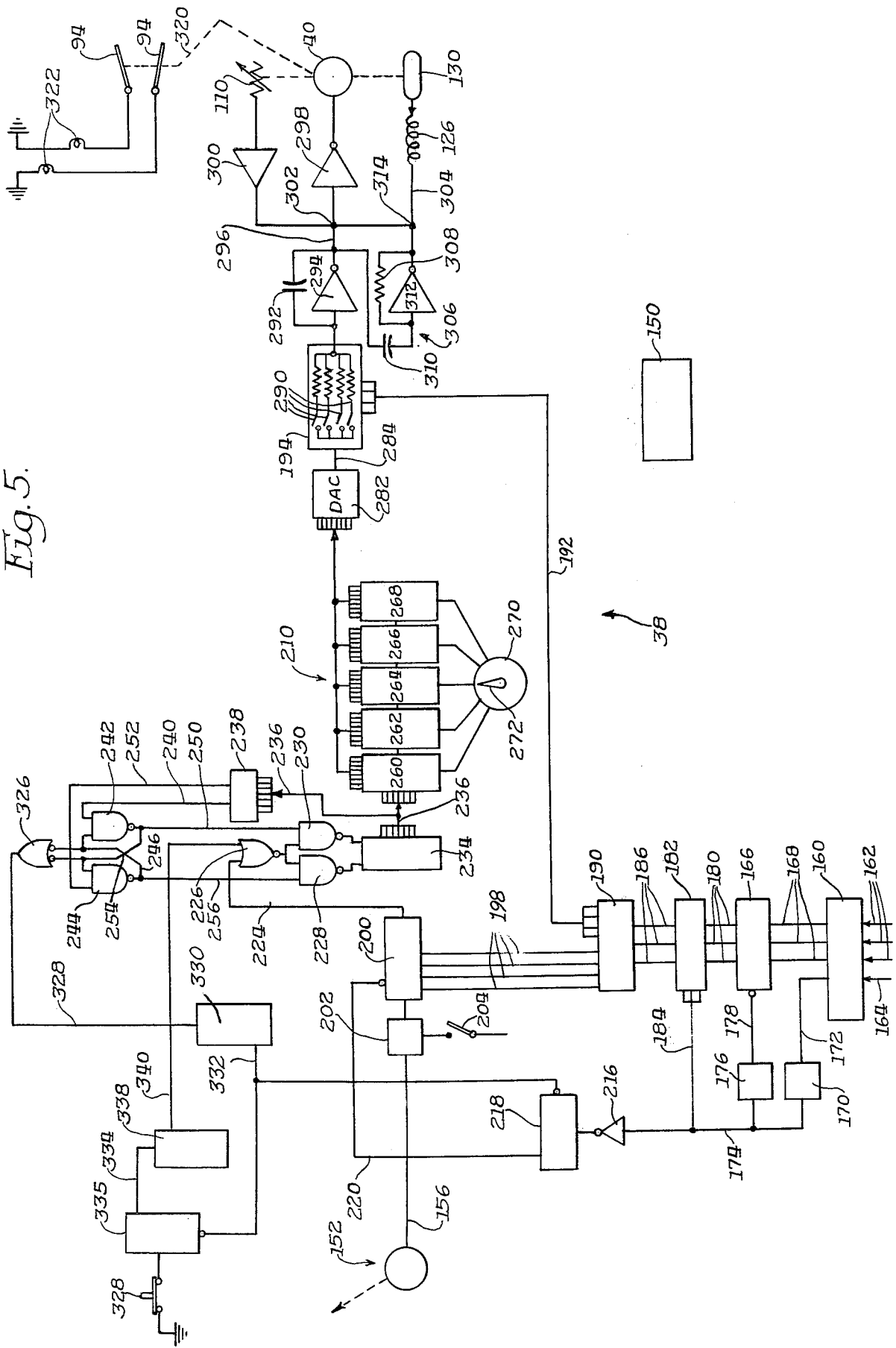

EXPOSURE CONTROL UNIT

BACKGROUND OF THE INVENTION

1. Field of the Invention

This invention relates to photographic film printers and particularly to a programmable exposure control device for use on film printers.

2. Description of the Prior Art

Photographic film printers are widely used in the motion picture industry for the improvement of a photographed scene with respect to image density, composition, color balance and the like. More advanced film printers have been provided for creating various special effects such as reverse action, double exposures, fade-ins, fade-outs, lap dissolves, and many other special optical effects as well as color balance corrections from film originally photographed on location or in the studio by conventional camera techniques.

When printing preprint film onto raw stock, it is often desirable that scenes be frequently faded out, faded in, or otherwise changed to create special effects. For example, transition from one scene to the next is often accomplished by fading out the first scene and fading in the following scene. These fades also can be made to occur within the same length of printed film so as to form what is commonly known as a lap dissolve.

Fades or dissolves of this type are conventionally accomplished by a conventional fader which comprises a device having movable vanes, capable of progressively varying the intensity of the printing beam at the film exposure aperture. To effect fade-outs, these vanes are moved together at a controlled rate to gradually eclipse the printing beam. Conversely, in fade-ins, the vanes are gradually separated so that the printing beam, which is initially entirely blocked out at the printing aperture, is gradually increased in intensity. Automation in film printing operations has greatly increased film printing speeds, and it therefore has been necessary that faders be automatically controlled in synchronism with the passage of the film through the printer so that fades will automatically occur at preset rates and at preselected positions or frames of the preprint film. Heretofore, automatic faders were capable of effecting fades only at a single predetermined rate which was a compromise rate for a limited number of film types. However, most modern films have exposure characteristics which are not linear and the exposure characteristics vary widely between different film compositions. Therefore, it is desirable to provide a fader having the ability to progressively vary the intensity of the printing beam at a particular nonlinear rate in accordance with the exposure characteristics of the particular raw stock being printed.

Additionally, presently available faders are designed to move only from a completely open position to a completely closed position without stopping at any point in between. However, with new artistic endeavors in the motion picture film industry, it is desirable to provide an exposure control device having the capability, for example, to reduce the intensity of the printing beam and then increase the intensity of the printing beam before reaching a closure point and perhaps continuing this varying of the intensity of the printing beam in a type of sinusoidal or other motion. With an exposure control of the present invention, many currently impossible printing techniques can be developed with movement of the shutter vanes completely controlled rather than simply being movable between an open to a closed position.

SUMMARY OF THE INVENTION

An object of the present invention is the provision of a programmable exposure control device for use in photographic film printing machines which automatically accomplishes fades at any predetermined rate, not necessarily linear, and at preselected positions or frames of the preprint film.

Another object of the present invention is the provision of a programmable exposure control device for use in a film printer for creating special effects not necessarily requiring a complete closure or complete opening of the shutter vanes but requiring a varying opening during a particular film scene.

Another object of the invention is the provision of such a programmable exposure control device for use in conjunction with a film printer having a variable controlled light source for establishing predetermined printing light corrections.

In accordance therewith, the present invention contemplates the provision of a programmable exposure control device for use on a photographic film printer including shutter means located in the printing light beam and movable between an open position and a closed position or any intermediate position, as well as between different intermediate positions, to progressively vary the intensity of said printing beam. A control means is provided for operating the shutter means between said positions in accordance with a predetermined rate. Programmable means is provided for the control means to permit varying of the predetermined operating rates for a particular film having a predetermined exposure characteristic. The programmable means may be connected to a tape reader and includes storage means for storing scene length information as well as memory means for storing a plurality of interchangeable film exposure characteristics for the particular film being printed. The control means also includes a servo-loop feedback system for the position and velocity of the shutter vanes as well as for control in accordance with the program.

Other objects, features and advantages of the invention will be apparent from the following detailed description taken in connection with the accompanying drawings.

BRIEF DESCRIPTION OF THE DRAWINGS

FIG. 1 is a perspective view of the mechanical elements of an exposure control device embodying the concepts of the present invention with the vanes in an open position;

FIG. 2 is a front elevational view of the structure of FIG. 1 showing the vanes in their closed position;

FIG. 3 is a side elevational view looking to the left in FIG. 2;

FIG. 4 is a vertical section taken generally along the line 4—4 of FIG. 2; and

FIG. 5 is a schematic block diagram of the electronic control means of the present invention.

DESCRIPTION OF THE PREFERRED EMBODIMENT

Continuous and incremental photographic film printers have been provided with several different types of cuing systems to automatically control light valves of the printer to vary the intensity and hue of the light for a particular scene being printed. Common types of cuing systems include a notch method where actual notches are provided along the length of the film, RF patch systems where metallic patches are provided along the length of the film, and frame count cuing systems where a continuous frame count is recorded for film passing through the printer. In all of these systems when a particular notch, RF patch, or predetermined frame is identified a cue signal is generated to initiate a particular light value change for the subsequent scene.

In film printers having automatic faders, it is necessary also to initiate the operation of the fader by an additional fader cue signal which can be supplied by any of the above mentioned methods. The exposure control device of the present invention is designed to be adapted to any one of these cuing systems and the details with respect to the generation of this signal need not be discussed in this text. A suitable frame count cuer for use with the present invention is shown in an application for a frame count cuer for photographic film printers, filed Sept. 26, 1974, Ser. No. 509,590, assigned to the Assignee of the present invention. While the exposure control device of the present invention is capable of varying the intensity of a printing light beam in numerous fashions, it will be described herein with reference to its use as an automatic fader, and as such, the description shall not be limited to this function. It is sufficient for this disclosure to start with a cue signal from one of an innumerable number of control systems which provide an initiating cue or signal for the beginning of a fade or other light variation.

For simplicity and organization, the description below will be divided into two major components, the mechanical elements and the electronic controls therefor.

MECHANICAL ELEMENTS

The mechanical components of the exposure control device, generally designated 10 (FIG. 1), are shown in FIGS. 1 through 4. In a typical film printer, the exposure control device 10 is positioned with the shutter means movable within the printing light beam provided by a suitable high intensity light source 12 (FIGS. 3 and 4). Normally, the exposure control device is positioned within the substantially white light source prior to its entry into a suitable dichrolic or other system for achieving color balance corrections.

The exposure control device 10 includes a flat frame or mounting plate 14 which is mounted directly on the film printer. The frame 14 has a rectangular aperture 16 (FIGS. 1 and 2) which is positioned within the printing light beam of the printer. Shutter means in the form of a pair of vanes, an upper vane 20 and a lower vane 22, are mounted for reciprocating movement toward and away from one another in front of the aperture 16. The shutter vanes 20 and 22 define the light beam aperture and, therefore, when the vanes 20 and 22 are at their extreme outer limits (FIG. 1), the light beam passing between the vanes is at its maximum intensity. Conversely, in FIG. 2, where the vanes 20 and 22 are shown adjacent one another, the light beam passing through the aperture 16 is completely blocked. As the vanes move toward one another from their position as shown in FIG. 1, the intensity of the light beam is progressively reduced until it is finally completely cut off as shown by the position of the vanes 20 and 22 in FIG. 2. Of course, when used to produce special effects, other than fades, the vanes can be controlled to reverse direction of movement at any point or even be held at any intermediate position, without moving, for a predetermined period of time.

The inward, adjacent edges of the vanes 20 and 22 each include an offset, overlapping portion, generally designated 24 (FIG. 4), so as to completely cut off the light beam from the film without actual contact between the vanes 20 and 22. The bottom vane 22 includes a raised horizontal forward boss 26 and a rear generally vertical upstanding flange 28 which mate with a forward, generally vertical flange 30 and a rearward notch 32 on the upper vane 20.

Drive means, generally designated 36, is provided for movement of the vanes 20 and 22 in the above described manner. The drive means of the present invention includes a control means, generally designated 38 (FIG. 5), for the movement of the vanes 20 and 22 at a programmed closing or opening rate. This programmed closing or opening rate for achieving a fade may be linear, but it is often desirable that the closure rate be nonlinear and, in fact, follow a predetermined exponential rate which is particularly suited for certain exposure characteristics of a particular film being printed. As will be described hereinafter, the control means 38 provides for the storage of up to five film characteristic curves which are suitable for common motion picture film printing. Of course, the memories may be easily changed to accommodate any type of film having a nonlinear exposure characteristic.

More particularly, the drive means 36 includes a commercially available printed circuit-type drive motor 40, of the type shown and described in U.S. Pat. No. 3,144,574. The drive motor 40 is mounted to the back of the frame plate 14 by a plurality of screws 42 with its shaft 44 extending forwardly through a clearance aperture 46 provided in the frame plate 14. An upper control arm 50 is secured to the shaft 44 by a set screw 52 provided on the control arm. The control arm 50 is pivotally connected at its ends to a pair of vertical reciprocating vane mounting links 54. Each vane mounting link 54 is pivotally connected at its lowermost opposite end to a second or lower control arm 56. All of the pivotal connections comprise a pivot pin 58 extending through appropriate aligned apertures in the control arms and vane mounting links which are secured therein by suitable C-washers 60. The lower control arm 56 is pivotally mounted to the frame plate 14 on a vertical line through the center of the aperture and the motor shaft 44 by a rotatable shaft 62 and screw.

Each of the vane mounting links 54 are generally U-shaped in cross section defining a generally vertical slot or guideway 66 (FIG. 1) between its flanges. Each of the vanes 20 and 22 are mounted to one of the vane mounting links by a pair of screws 70, or the like, between the flanges 68 of the mounting links. Each vane extends horizontally with its free end entering within the slot or guideway 66 which guides the free end of the vane to move in a substantially vertical plane.

Therefore, as the motor shaft 44 rotates the upper control arm 50, the vane mounting links reciprocate in opposite directions causing the vanes 20 and 22 to move either towards or away from one another from a closed position to an open position or vice versa depending upon the direction of rotation of the motor shaft. For example, in FIG. 2, rotation of the motor shaft in a counterclockwise direction as shown by arrow A, will cause the vanes to move from a completely closed position to a completely open position.

A pair of ajustable limit stops, generally designated 76, are provided by a V-shaped mounting block 78 near the upper end of the frame 14 having a pair of set screws 80 threaded therein. Each set screw 80 includes a lock nut 82 to hold the set screw in a predetermined position. As the upper control arm pivots, the end of its travel will be determined by engagement with the tip 84 of one of the set screws 80 (FIG. 2). In actual practice, however, since the movement of the vanes by the motor are precisely controlled, the control arm 50 is designed so as to avoid engagement with the set screws 80 except in the case of electrical or electronic failure.

Limit switch means, generally designated 90, is provided to indicate whether the vanes 20 and 22 are in their completely open or completely closed position. The limit switch means 90 includes a second, similar V-block 92 mounted below the upper control arm 50 with a pair of contacts 94 extending upwardly through the block 92 at an angle approximately 30° from the vertical. An upper conductive contact element or plate 96 is secured to the upper control arm by a pair of screws 98 and includes a pair of forwardly directed tabs 100 positioned to engage the ends of the contacts 94. The conductive contact plate 96 is connected by a lead 102 to a power source which illuminates a "closed" light or an "open" light through the contact 94 and leads 104 when the vanes 20 and 22 are in the closed or open limit positions. For example, in FIG. 1, when the lefthand contact 94 is made the open signal will be illuminated. Similarly, in FIG. 2, when the righthand contact 94 is made the closed signal will be illuminated signalling that the exposure control device is in the closed position. Unlike the limit means 76, in actual operation, contact will be made on the limit switch means 90.

The control means 38, as will be described below, includes a servo-loop control system for accurate performance of the programmed information. To this end, feedback devices in the form of a potentiometer, generally designated 110, and solenoid means, generally designated 112, are provided on the mechanical components for feedback purposes. More particularly, the potentiometer 110 is mounted on a U-shaped block or bracket 114 with its axis aligned with the pivot points 58 of the lower control arm 56. The rotatable shaft 62 is the potentiometer shaft (FIG. 4) which is connected to the control arm 56 to rotate therewith. After initial adjustments, the potentiometer will then output a signal relative to the position of the lower control arm 56 to feedback to the control system 38 the position of the control arm 56 and thus the vanes 20 and 22. A plurality of potentiometer leads 116 are connected directly to the control system 38.

Similarly, the solenoid means 112 includes a solenoid 126 mounted by a U-shaped bracket 124 to the frame 14. The bracket is a central generally vertical aperture therein formed by holes 128 in the legs of the U-shaped bracket. A permanent magnet bar 130 is mounted to the righthand vane mounting line 54 by an L-shaped block 134. As the vanes 20 and 22 move, the magnet 130 will move within the solenoid providing a feedback signal to the control means 38 relative to the vane movement velocity. The leads (not shown) from the solenoid are connected to the control system 38.

A slight amount of clearance is necessary between the pivotal connections of the control arms and vane mounting links for assembly and, since the position feedback is measured from the movement of the lower control arm 56, it is desirable to bias all of these pivotal connections to eliminate possible backlash. To this end, a pair of coil springs 138 are connected to each of the control arms 50 and 56 to bias the complete linkage system. Each of the springs 138 is mounted by an L-shaped bracket 140 mounted to the side of the righthand vane mounting link. Additionally, the upper biasing spring 138 is offset forwardly by a forwardly directed flange 142 to additionally bias the linkage in the horizontal plane in an attempt to eliminate horizontal end play.

CONTROL MEANS

Heretofore, except for references to the control means 38, and the feedback potentiometer 110 and solenoid 126, only the mechanical elements have been discussed and therefore a brief introduction to the control means 38 is hereinafter set forth.

The control means 38 of the preferred embodiment generally includes a system providing for 6 possible fade lengths or other special effect scene lengths, in terms of numbers of frames on the film. For example, a fade can extend for a length of 16, 24, 32, 48, 64 or 96 frames for either 35mm film or 16mm film. While this criterion is completely arbitrary, and only minor changes would be necessitated, practically any length of scene fade or film format could be provided with the control means 38 of the present invention. The control means 38 also includes five memory units for storing five particular film characteristic exposure curves. It is contemplated that additional memory units and therefore expanded versatility could be provided by simply increasing the storage capacity of the device. Therefore, what is shown and described is intended to be exemplary only and no limitations should be interpreted from the particular numbers or limited functions of the described elements.

Referring to FIG. 5, the control means 38 includes a separate power supply 150 which operates the control means with a plurality of input voltages and is completely electrically isolated from the actual photographic film printer. Only two sources of information are necessary for the operation of the exposure control device 10. Particularly, transducer means, generally designated 152 (to the left in FIG. 5), derives information from the printer relative to the quantity of film transported through the printer. The transducer means 152 is of a conventional type such as a chopper wheel being driven from the sprocket shaft and known light emitting diodes and light sensitive transistors for reading the passage of the slots past a reference point. In the particular embodiment, each revolution of the sprocket shaft generates 960 pulses to the control means through line 156 (to the left in FIG. 5).

The other source of information to the control system 38 is provided by a programmed control element such as a conventional prepunched paper tape and tape reader. This set of information is received from an optical isolater 160 such as a combination of light emitting diodes and light sensitive transducers. This additional isolation prevents any ambient electrical noise from being passed to the control means 38 from the printer which could cause certain errors to be introduced into the system. This input information comprises three signals along lines 162 which will determine the length of a particular fade or other light variation in a particular number of frames. As can be seen, the three lines provide a combination of six possible fade lengths which are predetermined in advance by the programmer and are provided in a particular row on the prepunched tape. Each time a set of information is received, the tape is sequentially advanced to the next set of information, as will be described in detail below. The fourth line 164 to the optical isolater 160 provides a cuing signal to instruct the control means to begin a particular fade-in or fade-out or other function. When the fade length signal is received, it is transmitted to a first register 166 via lines 168 from the optical isolater. This first register 166 is a conventional flip-flop and acts as a delay to accept programmed information prior to the actual execution of a fade so that upon the occurrence of a cue signal through line 164 the fade scene length information can be utilized without the required delay for stepping the control element through the reader.

When a cue signal is received along line 164 by the optical isolater 160, it is transferred to an adjustable cue signal delay 170 along line 172. This cue signal delay permits adjustment for precise execution of the fade at the predetermined fade line. The output line 174 from the fade delay actuates a one shot delay 176. The inverted output of the one shot 176, through line 178 clears the first register 166 sending the scene fade length information along lines 180 to a second register 182 thus permitting entry of new scene length fade information into the first register 166. Simultaneously, the signal output from the fade delay clears the second register through line 184 causing the fade length information to be dumped along lines 186 into a modulus memory selector 190. The modulus memory selector 190 includes six permanently stored 8 bit words, one of which is selected by each of the combination of signals along lines 186. Four bits, or half of each word, are transmitted along line 192 to a multiplexer 194 for varying an integration constant, which will be described in greater detail below.

The remaining half, or four bits, of information from a particular word is transmitted from the modulus memory selector 190 along a plurality of lines 198 to a programmable divider or variable modulus divider 200 which in conjunction with the signals from the transducer means 152 provides a predetermined constant output.

More particularly, in either film format application, the transducer pulses are related directly to the quantity of the film transported through the printer. In the case of 35mm raw stock and preprint film, 60 pulses are generated for each film frame passing through the printer. In the case of 16mm raw stock and preprint film, 24 pulses are generated for each film frame. Therefore, in order to provide adaptability to both film formats, a manually settable divider 202 is connected to the input line 156 to divide the input pulses by five when using 35mm film or to divide the input pulses by two when using 16mm film. A conventional toggle switch 204 is provided for manual positioning for either 35mm or 16mm to provide the appropriate divider, i.e., five for 35mm or two for 16mm. Thus, for a particular fade length in number of frames, the manual divider provides a constant output for either 35mm film or 16mm film when using the appropriate divider.

As will be described later, the particular predetermined characteristic exposure curves for a number of films are stored in five 96 × 8 read only memories or ROM digital storage units, generally designated 210. Therefore, the output signal from the programmable divider 200 is designed to divide the input pulses from the manual divider 202 by an appropriate value necessary to provide a 96 count output.

According to the possible fade lengths between 16 frames and 96 frames, the appropriate divider for either 35mm film or 16mm film will be, 2 for a 16 frame fade, 3 for a 24 frame fade, 4 for a 32 frame fade, 6 for a 48 frame fade, 8 for a 64 frame fade or 12 for a 96 frame fade. The appropriate command is supplied to the programmable divider by the four bit information supplied by one of the six stored words in the modulus memory selector along lines 198. When the appropriate divider for a particular fade length is supplied by the programmable divider, the output signal therefrom will provide 96 pulses for the entire fade length for any fade length between 16 frames and 96 frames. The divider information along lines 198 to the programmable divider is supplied by the proper selection of hole punches along the control element to select the appropriate 8 bit word stored within the modulus memory selector.

The remainder of the control means 38 provides for a progressive count of the 96 pulses from the programmable divider to the storage means 210 and an automatic shutoff therefor. More particularly, referring to FIG. 5, line 174 feeds the fade cue signal through an amplifier 216 to a bi-stable flip-flop 218. The fade cue signal into the flip-flop 218 provides a run signal through line 220 to the programmable divider which clocks or begins counting the transducer pulses. The 96 count signal is transferred via line 224 to an OR-gate 226. The OR-gate 226 is connected to two AND-gates 228 and 230 to provide an incremental "up" or decremental "down" count, respectively. The AND-gates 228 and 230 are both connected to a bi-directional counter 234 which then outputs an up or down signal to the memory means 210 via line 236. Line 236 also is connected to a zero or 95 detector 238 which identifies the beginning position of the fader vanes 20 and 22. When the fader vanes are open an output signal is provided by the detector 238 along line 240 to a typical set-reset flip-flop unit. Line 240 feeds the signal to a first AND-gate 242 thereby changing the state of a second flip-flop 244 which provides an output signal on line 246 which is crossed back to the first flip-flop 242 thereby providing an output signal along line 250 to the "down" AND-gate 230 which in conjunction with the variable divider output from the OR-gate 226 inputs the divider output pulses to the counter which operates in a down mode to cause the vanes to close. Likewise if the fader is closed an output signal from the detector along line 252 into the second AND-gate 244 causes the first flip-flop 242 to switch states. The output signal along line 254 is crossed to the second AND-gate providing an output signal along line 256 to the up AND-gate 228 and, in conjunction with the variable divider, causes output pulses to begin the counter operating in an up mode.

The five ROM storage units, generally designated 210, include five individual 96 × 8 memory units 260, 262, 264, 266 and 268. Each storage unit stores digital information related to a particular film characteristic exposure curve or any other curve which may be desired in order to provide any particular special effect or exposure. When used as a fader, each stored curve is particularly adapted to a fade exposure curve of the particular type of film being printed by the film printer. The storage units 260–268 are connected to a film selector switch 270 which is manually set by the printer operator according to the particular film being printed before operation thereof. Therefore, only one of the storage units 260–268 will be used in a particular application of a fade and will not be changed until a different type of film is being processed on the printer. The memory units 260–268 store 96 positions to which the vanes 20 and 22 will be moved. However, for smooth operation of the exposure control device, it is desirable that the digital information be converted to an analog signal. Each output signal from the counter through line 236 selects a particular positional information word from one of the memory units, e.g., unit 264 as designated by the pointer 272 for output to a conventional digital to analog converter (DAC) 282. The digital to analog converter processes the digital information to provide an output analog curve along line 284 representative of the digitally stored film exposure curve.

However, as stated previously, the particular curve can be applied over a fade length from between 16 and 96 frames. Therefore, the integration constant necessary for the various fade lengths will of necessity have to be varied in accordance with a particular fade length. To this end, the multiplexer 194 provides for the selection of any combination of four predetermined resistors 290, determined by the four bit information supplied thereto by the modulous memory selector 190. The appropriate resistor or combination of resistors 290 in combination with a feedback capacitor 292 provide the correct integration constant through the amplifier 294 which supplies the output command signal along line 296 for the drive means 36. The command signal 296 again is amplified and inverted by an amplifier 298 connected to the drive motor 40 for moving the vanes as described with respect to the mechanical elements in the earlier part of this disclosure.

Position feedback control is supplied by the potentiometer 110 through an amplifier 300 and is fed back and summed with the command signal at a summing junction 302. Additionally, it is desirable to have a velocity feedback signal in order to control the velocity of the moving vanes 20 and 22 so as to avoid acceleration caused deviations from the programmed curve. Again, as described earlier, a velocity feedback signal generated by the solenoid 126 is fed through line 304 to the summing junction 302 for dampening. However, if a velocity feedback is provided, a velocity command signal must also be provided in order for velocity errors to be independent of positional errors and thus be detected. The velocity feedback in this case is a negative polarity and therefore a positive velocity command signal is generated from the position command by a differentiator, generally designated 306. The differentiator 306 comprises a conventional resistor 308, capacitor 310, and amplifier 312 which when summed at junction 314 provide a corrective feedback signal to the summing junction 302.

Additionally, a mechanical connection represented by the dotted line 320 between the motor and the contacts 94 provide a signal to illuminate one of two lamps 322 informing the operator that the vanes of the exposure control device are either open or closed.

In order to automatically de-activate the control means 38 after the execution of a particular operational curve, output from the detector 238 is fed to an OR-gate 326 which supplies a signal along line 328 to a one-shot 330. The one-shot 330 outputs a pulse along line 332 to the "run" flip-flop 218 which then clears that flip-flop 218 to de-activate the control means 38.

Additionally, during set up of the printer or for executing a lap dissolve, it may be desirable for the operator to manually open or close the exposure control device vanes 20 and 22 prior to start up of the machine. Since the only drive means for the vanes 20 and 22 is the motor 40, and since the only command to the motor 40 is through the control means 38, a synthetic pulse signal must be provided in order to close or open the vanes which of course will then follow one of the preselected program curves.

More particularly, a cycle switch 328 is provided for manual actuation for selected opening or closing of the vanes. The cycle switch is connected to flip-flop 335 and, when depressed, provides a synthetic run signal along line 334 to an oscillator 338. The oscillator 338 then outputs along line 340 to the OR-gate 226 which then drives the system through a complete cycle as previously described. When the cycle is complete an output signal from the OR-gate 326 through line 328 to the one-shot 330 causes an output signal along line 332 to clear the flip-flop 335 and thus de-activate the drive means.

Therefore, as can be seen from the above description, the mechanical vane assembly 10 in conjunction with the programmable control means 38 provides an exposure control device which is capable of operating the vanes 20 and 22 to vary the intensity of the printing light beam in accordance with any predetermined curve stored in one of the memory units 210. When the exposure control device is used to create a fade, the curve may be chosen in accordance with a particular film exposure characteristic for the particular film being used so as to progressively close or open the fader vanes to decrease or increase the intensity of the light for exposing the raw stock at a rate that is particularly adapted to that film. In addition, any program may be prepared and the curve stored in the memory 210 to create any unusual or special effects which may be activated selectively within a film run. For example, it may be desirable to partially close the vanes 20 and 22 to a predetermined point and then hold the vanes stationary for a predetermined length and then finally move the vanes to a fully closed position to produce a desired effect. Similarly, any desired movement of the vanes 20 and 22 can be accomplished by providing and storing a different program curve. Of course, the ROMs 260–268 can be easily changed or programmed for any particular film exposure curve which may even be linear. However, most if not all films currently in use have a nonlinear exposure characteristic curve. The feedback means 110 and 112 connected to the mechanical vane assembly portions continuously monitor the position and velocity of the vanes 20 and 22 and provide for controlled accurate execution of the preprogrammed curve stored in the memory 210.

The foregoing detailed description has been given for clearness of understanding only and no unnecessary limitations should be understood therefrom as some modifications will be obvious to those skilled in the art.

We claim:
1. An exposure control device for a photographic film printer having a light beam for exposure of the film, comprising:

shutter means positioned in the path of said light beam and mounted for movement between a first position wherein the intensity of said light beam is substantially unaffected and a second position wherein the intensity of said light beam is substantially cut off, to thereby vary the intensity of the light beam for exposing the film;

control means for moving the shutter means between said positions; and programmable means for said control means including storage means for storing a plurality of preselected operating rates to effect operation of said shutter means to vary the intensity of said light beam in accordance with a predetermined film exposure characteristic.

2. The exposure control device of claim 1 wherein said control means includes a feedback means responsive to the movement of said shutter means to effect operation thereof in accordance with said programmable means.

3. The exposure control device of claim 2 wherein said feedback means includes a position indicating means for said shutter means to adjust said control means in response to deviations from position dictates of said programmable means.

4. The exposure control device of claim 2 including signal means responsive to the position of said shutter means for indicating whether said shutter means is in its first or second position.

5. The exposure control device of claim 1 wherein said shutter means includes a pair of reciprocally mounted vanes, said vanes being adapted to move between said first position toward one another to said second position.

6. An exposure control device for a photographic film printer having a light beam for exposure of the film, comprising:

shutter means positioned in the path of said light beam and mounted for movement between a first position wherein the intensity of the light beam is substantially unaffected and a second position wherein the intensity of said light beam is substantially cut off, to thereby vary the intensity of the light beam for exposing the film;

control means for moving the shutter means between said positions at a non-linear rate; and programmable means for said control means to effect operation of said shutter means to vary the intensity of said light beam in accordance with a predetermined exposure curve dictated by said programmable means.

7. An exposure control device for a photographic film printer having a light beam for exposure of the film, comprising:

shutter means positioned in the path of said light beam and mounted for movement between a first position wherein the intensity of the light beam is substantially unaffected and a second position wherein the intensity of the light beam is substantially cut off, to thereby vary the intensity of the light beam for exposing the film;

control means for moving the shutter means between said positions;

programmable means for said control means to effect operation of said shutter means to vary the intensity of said light beam in accordance with a predetermined exposure curve dictated by said programmable means; and feedback means responsive to the movement of said shutter means to effect the operation thereof, said feedback means including a velocity indicating means for said shutter means to adjust said control means in accordance with said programmable means.

8. An exposure control device for a photographic film printer having a light beam for exposure of the film, comprising:

shutter means positioned in the path of said light beam and mounted for movement between a first position wherein the intensity of said light beam is substantially unaffected and a second position wherein the intensity of said light beam is substantially cut off, to thereby vary the intensity of the light beam for exposing the film, said shutter means including a pair of shutter vanes reciprocally mounted by a pair of spaced, parallel guide rails, said guide rails being pivotally connected at their ends to a pair of rotatable connecting arms for reciprocal movement of the vanes in response to rotation of the connecting arms;

control means for moving the shutter means between said positions; and programmable means for said control means to effect operation of said shutter means to vary the intensity of said light beam in accordance with a predetermined exposure curve dictated by said programmable means.

9. The exposure control device of claim 8 wherein said connecting arms are rotatably mounted on a frame with one of the connecting arms connected to a drive means for rotation in response to energization of the drive means, said control means including position feedback means connected to the other of said connecting arms for position monitoring in response to movement of said vanes.

10. The exposure control device of claim 9 including anti-backlash resilient means connected to at least one of said connecting arms to eliminate lost motion thereof to assure accurate position feedback to said control means.

11. The exposure control device of claim 8 including velocity feedback means operatively associated with at least one of said guide rails for velocity monitoring in response to movement of said vanes.

12. The exposure control device of claim 11 including presettable stop limit means associated with at least one of said connecting arms to prevent accidental damage to said shutter elements in the event of failure of said control means.

13. An exposure control device for a photographic film printer having an exposure light beam, comprising:

shutter means positioned in the path of said light beam and mounted for movement between a closed position and an open position to progressively vary the intensity of said beam;

control means for moving said shutter means between said positions in accordance with a predetermined rate; and programmable means for said control means to permit changing of said predetermined rate in accordance with a predetermined exposure characteristic for a particular film, said programmable means including storage means for storing fade scene length information, and memory means for storing a plurality of preselected operating rates for controlling the movement of said shutter means.

14. The exposure control device of claim 13 wherein said programmable means includes reader means for intermittently sensing information bits from a control element for storage in said storage means.

15. A programmable fader for use in a photographic film printer having a printing light beam for exposure of the film, comprising:
a frame;
a pair of shutter vanes on the frame, movable between a first position wherein the intensity of said printing light beam is substantially unaffected and a second position wherein the intensity is substantially reduced to thereby permit varying of the intensity of the printing light beam for controlled exposure of the film;
control means for moving the shutter vanes between said positions; and
programmable means for said control means including storage means for storing a plurality of preselected operating rates to effect movement of the shutter vanes in accordance with one of said predetermined rates to progressively vary the intensity of the printing light beam in accordance with the exposure characteristics of a particular film.

16. The programmable fader of claim 15 wherein said control means includes feedback means responsive to the movement of said shutter vanes to effect operation thereof in accordance with said programmable means.

17. The programmable fader of claim 16 wherein said feedback means includes a position indicating means for said shutter vanes to adjust said control means in response to deviations from position dictates of said programmable means.

18. The programmable fader of claim 15 including signal means responsive to the position of said shutter vanes for indicating whether said shutter vanes are in the first or second position.

19. A programmable fader for use in a photographic film printer having a printing light beam for exposure of the film, comprising:
a frame;
a pair of shutter vanes on the frame, movable between a first position wherein the intensity of said printing light beam is substantially unaffected and a second position wherein the intensity is substantially reduced to thereby permit varying of the intensity of the printing light beam for controlled exposure of the film;
control means for moving the shutter vanes between said positions at a non-linear rate; and
programmable means for said control means to effect movement of the shutter vanes in accordance with a predetermined rate to progressively vary the intensity of the printing light beam in accordance with the exposure characteristics of a particular film.

20. A programmable fader for use in a photographic film printer having a printing light beam for exposure of the film, comprising:
a frame;
a pair of shutter vanes on the frame, movable between a first position wherein the intensity of said printing light beam is substantially unaffected and a second position wherein the intensity is substantially reduced to thereby permit varying of the intensity of the printing light beam for controlled exposure of the film;
control means for moving the shutter vanes between said positions;
programmable means for said control means to effect movement of the shutter vanes in accordance with a predetermined rate to progressively vary the intensity of the printing light beam in accordance with the exposure characteristics of a particular film; and
feedback means responsive to the movement of said shutter means to effect the operation thereof, said feedback means including a velocity indicating means for said shutter means to adjust said control means in accordance with said programmable means.

21. A programmable fader for use in a photographic film printer having a printing light beam for exposure of the film, comprising:
a frame;
a pair of shutter vanes on the frame, movable between a first position wherein the intensity of said printing light beam is substantially unaffected and a second position wherein the intensity is substantially reduced to thereby permit varying of the intensity of the printing light beam for controlled exposure of the film, said vanes being mounted on a pair of spaced, parallel guide rails, said guide rails being pivotally connected at their ends to a pair of rotatable connecting arms for reciprocal movement of the vanes in response to rotation of the connecting arms;
control means for moving the shutter vanes between said positions; and
programmable means for said control means to effect the movement of the shutter vanes in accordance with a predetermined rate to progressively vary the intensity of the printing light beam in accordance with the exposure characteristics of a particular film.

22. The programmable fader of claim 21 wherein said feedback means includes a position indicator connected to at least one of said connecting arms to adjust said control means in response to deviations from a predetermined position.

23. The programmable fader of claim 22 wherein said feedback means includes a velocity indicator to adjust said control means in response to deviations from a predetermined velocity.

24. The programmable fader of claim 22 wherein said connecting arms are rotatably mounted on the frame, with one of said connecting arms connected to a drive means for rotation in response to energization of the drive means by the control means.

25. The programmable fader of claim 21 including anti-backlash resilient means connected to at least one of said connecting arms to eliminate lost motion thereof to assure accurate feedback to said control means.

26. A programmable fader for use in a photographic film printer having a printing light beam for exposure of the film, comprising:
a frame;
a pair of shutter vanes on the frame, movable between a first position wherein the intensity of said printing light beam is substantially unaffected and a second position wherein the intensity is substantially reduced to thereby permit varying of the intensity of the printing light beam for controlled exposure of the film;

control means for moving the shutter vanes between said positions;

programmable means for said control means to effect movement of the shutter vanes in accordance with a predetermined rate to progressively vary the intensity of the printing light beam in accordance with the exposure characteristics of a particular film; and programmable means for said control means to effect movement of the shutter vanes in accordance with a predetermined rate to progressively vary the intensity of the printing light beam in accordance with the exposure characteristics of a particular film, said programmable means including reader means for intermittently sensing information bits from a control element relating to scene length information and selection means for choosing one of a plurality of memory means bearing information related to a particular film characteristic exposure curve.

* * * * *